United States Patent [19]

Walton

[11] Patent Number: 5,226,765
[45] Date of Patent: Jul. 13, 1993

[54] LOAD-INDICATING FASTENER

[75] Inventor: Brian Walton, Dudley, England

[73] Assignee: Rotabolt Limited, England

[21] Appl. No.: 847,046

[22] PCT Filed: Nov. 13, 1990

[86] PCT No.: PCT/GB90/01746
   § 371 Date: Apr. 16, 1992
   § 102(e) Date: Apr. 16, 1992

[87] PCT Pub. No.: WO91/08398
   PCT Pub. Date: Jun. 13, 1991

[30] Foreign Application Priority Data

Nov. 27, 1989 [GB] United Kingdom ............... 8926729

[51] Int. Cl.5 .................... F16B 31/02; G01L 5/00
[52] U.S. Cl. ...................... 411/14; 411/916;
   73/761; 116/212; 116/DIG. 34
[58] Field of Search .......... 411/13, 14, 916;
   73/761; 116/212, DIG. 34

[56] References Cited

U.S. PATENT DOCUMENTS 4,636,120 1/1987 Brandsberg et al. ............... 411/14
4,927,305 5/1990 Peterson, Jr. ................... 411/14

Primary Examiner—Neill R. Wilson
Attorney, Agent, or Firm—Kirschstein, Ottinger, Israel & Schiffmiller

[57] ABSTRACT

A load indicating fastener such as a bolt (10) or stud, has a shank (12) which is subject to tensile loading in use. The shank (12) has an axially extending bore (22) which receives a first gauge pin (30) anchored at its inner end (32) to the shank (12) and protruding outwards beyond an end face (16) of the fastener. An indicating member (40) is rotatable on the protruding portion of the gauge pin (30) between the end face (16) of the fastener and the head (34) of the pin (30), so that the indicating member (40) is free to rotate when the shank (12) of the fastener is unstressed but when the shank (12) is subject to a predetermined tensile loading is held against rotation by contact with the end face (16) of the fastener. A second gauge pin (42) is received within an axially extending bore (36) in the first gauge pin (30) and is anchored at is inner end and protrudes outwards beyond the outer end of the first gauge pin (30). A second indicating member (50) is rotatable on the protruding part of the second gauge pin (42), between the head (46) of the pin (42) and the first indicating member (40). The second indicating member (50) is free to rotate when the shank (12) of the fastener is unstressed or subject to the first predetermined loading, but when the shank (12) is subject to a second predetermined tensile loading greater than the first predetermined loading, the second indicating member (50) is held against rotation by contact with the first indicating member (40). The first indicating member (40) provides an indication when the fastener has been tightened to a desired loading. The second indicating member (50) provides an indication when the fastener has been overloaded.

7 Claims, 2 Drawing Sheets

LOAD-INDICATING FASTENER

BACKGROUND OF THE INVENTION

1. Field of the Invention

This invention relates to load-indicating fasteners.

The invention relates in particular to fasteners, such as bolts or studs, which in use are subject to tensile loading. It is often important to ensure that the fastener is tightened to a predetermined loading. It is known to use the stretching of the fastener which occurs under tensile loading to give an indication when the appropriate loading has been reached.

2. Description of Related Art

European patent EP 0 049 537B describes a load indicating fastener having a shank with an axially extending bore which receives a gauge pin anchored at its inner end to the shank and protruding outwards beyond an end face of the fastener, with an indicating member rotatable on the protruding part of the gauge pin and arranged so that the indicating member is free to rotate when the fastener is unstressed but when the fastener is subject to a predetermined tensile loading is held against rotation by contact with the end face of the fastener.

The gauge pin and indicator member are usually set with an initial gap between the indicator member and the end face of the fastener such that the gap is closed when the fastener is subjected to the predetermined loading and the end face bears against the indicator member sufficiently to prevent its being rotated by hand.

A difficulty which can arise in use of the fastener described in EP 0 049 537B is that to ensure that the fastener is not over-tightened, the operator has to check the indicator member at frequent intervals during tightening. This problem is particularly acute when the fastener is tightened using a power tool. Moreover, after the fastener has been tightened, there is nothing to indicate whether the fastener has been over-stressed.

SUMMARY OF THE INVENTION

It is an object of this invention to provide a load indicating fastener which avoids this problem.

The present invention consists in a load indicating fastener comprising a body having a shank which is subject to tensile loading in use, the body having a bore which extends axially from an end face of the body into the shank and which receives a gauge pin anchored at its inner end to the shank and protruding outwards beyond the end face of the body, an indicating member rotatable on the protruding portion of the gauge pin and arranged so that the indicating member is free to rotate when the shank of the fastener is unstressed but when the shank is subject to a predetermined tensile loading is held against rotation by contact with the end face of the body, characterised in that the gauge pin has an axially extending bore, and the fastener further comprises a second gauge pin which is received within the bore in the first gauge pin and is anchored at its inner end and protrudes outwards beyond the outer end of the first gauge pin, and a second indicating member which is rotatable on the protruding part of the second gauge pin, the second indicating member being free to rotate when the shank of the fastener is unstressed or subject to the first predetermined loading, but being held against rotation by contact with another part of the fastener when the shank is subject to a second predetermined tensile loading greater than the first predetermined loading.

The second gauge pin and indicator member can be set so that the second indicator member is held against movement when the tensile loading reaches a maximum desired value. Thus, in use, if the second indicator member cannot be rotated, the operator will know the fastener has been overtightened. Moreover, the state of the fastener can subsequently be easily checked, by simply checking both indicator members. If the fastener is at the correct tension, the first indicating member will be held against rotation whilst the second will rotate freely. If neither member can rotate, this will indicate that the fastener has been overtightened. If both indicator members rotate freely this will indicate that the fastener requires retightening.

In one form of the invention, the second gauge pin is anchored at its inner end to the first gauge pin.

In another form of the invention, the second gauge pin is anchored at its inner end to the shank of the fastener.

In one embodiment of the invention, the first indicator is a disk trapped between the outer end of the body of the fastener and a head on the outer end of the first gauge pin, and the second indicator member has an inner face arranged to abut the outer face of the disk, with a recess formed in the inner face of the second indicator member to accommodate the head of the first gauge pin. The second indicator member may be trapped between the first indicator member and an enlarged head at the outer end of the second gauge pin.

BRIEF DESCRIPTION OF THE DRAWING

The invention will now be described, by way of example, with reference to the accompanying drawings, in which.

DETAILED DESCRIPTION OF THE PREFERRED EMBODIMENTS

Figure 1:
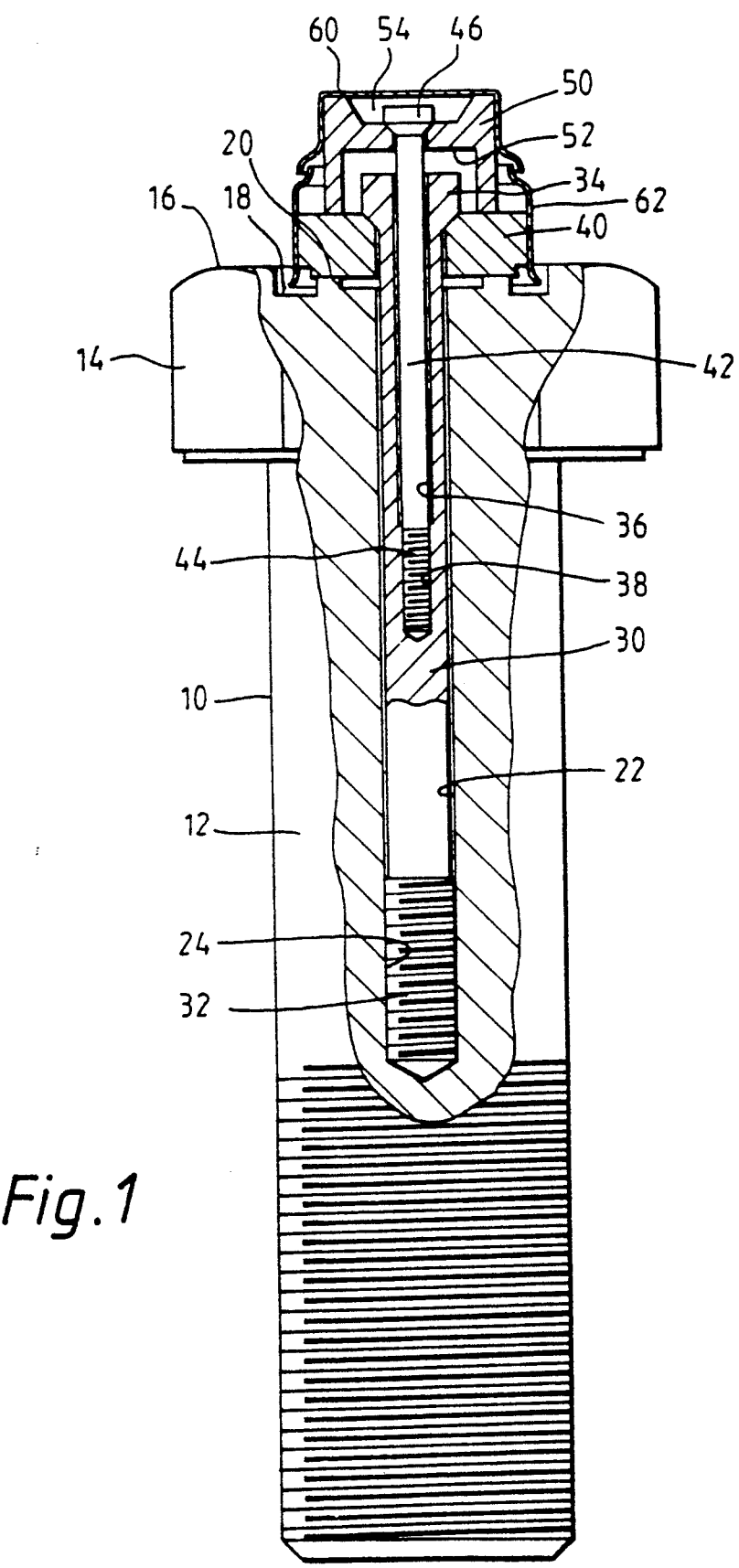
FIG. 1 is a side elevation, partly in cross-section, of a bolt in accordance with the invention.

Referring to FIG. 1, a bolt 10 has a shank 12 and head 14. A bore 22 of uniform diameter extends from the end face 16 of the head, partway through the shank 12. The bore 22 is internally screw threaded over a short length 24 extending from its inner end.

A first gauge pin 30, having an outside diameter slightly less than the inside diameter of the bore 22, extends through the bore 22 and is anchored at its inner end to the shank 12 by means of a threaded portion 32 at the end of the pin which engages the threaded portion 24 of the bore 22. The outer end of the gauge pin 30 projects outwards from the outer face 16 of the bolt and terminates in an enlarged head 34.

A first indicator member in the form of a disk 40 is positioned between an abutment 20 formed in a machined recess 18 in the end face of the bolt and the head 34 of the first gauge pin 30, the gauge pin fitting through a central hole in the disk 40 so that the disk is normally free to rotate on the pin.

The first gauge pin 30 is in itself formed with a uniform diameter bore 36, extending axially through the head 34 and partway along the length of the pin 30. The bore 36 has an internally threaded portion 38 near its inner end. A second gauge pin 42, having an outside diameter slightly less than the inside diameter of the bore 36 in the first gauge pin 30, extends through the bore 36 in the first gauge pin 30 and is anchored to the first gauge pin 30 by means of a threaded portion 44 at its inner end which engages the internal thread 38 of the bore 36. At its outer end, the second gauge pin 42 projects beyond the head 34 of the first gauge pin 30, and itself terminates in an enlarged head 46.

A second indicator member 50 is positioned between the enlarged head 46 of the second gauge pin 42 and the first indicator member 40. The second gauge pin 42 passes through a hole in the second indicator member 50 so that it is free to rotate on the pin 42. The inner face of the indicator member 50 is formed with a recess 52 to accommodate the head 34 of the first indicator pin 30 so that the second indicator member 50 can rotate without interference from the first gauge pin 30. The outer face of the indicator member 50 is also formed with a recess 54, which receives the head 46 of the pin 42, so that the head 46 does not project outwards beyond the indicator member 50.

The first and second gauge pins 30 and 42 are set so that when the bolt is unstressed there are predetermined clearances between the first indicator member 40 and the abutment 20 at the end face 16 of the bolt, and between the second indicator member 50 and the outer face of the first indicator member 40. In use, when the bolt is tightened, the shank 12 is stretched elastically. Since the first gauge pin 30 is anchored only at its inner end to the shank 12 of the bolt, it is not stretched, and the elongation of the shank of the bolt causes the gap between the first indicator member 40 and the abutment 20 to close and pressure to be exerted on the indicator member 40 which holds it against rotation. The initial gap between the first indicator member 40 and the abutment 20 is set so that as the tensile loading on the bolt reaches a first predetermined level, the pressure on the first indicator member 40 prevents it being turned by hand. If the bolt is tightened further, further elongation of the shank 12 of the bolt, and consequently of the first gauge pin 30, closes the gap between the first indicator member 40 and the second indicator member 50, until pressure between the two prevents the second indicator member 50 from rotating. This is set to occur at a second predetermined tensile loading, so that when the second indicator member 50 is not free to rotate this gives an indication that the bolt has been overtightened.

The first and second gauge pins 30 and 42 are preferably of a material compatible with that of the bolt, so that the operation is unaffected by changes in temperature. The indicator members may be of any suitable material, for example stainless steel.

A protective cap 60 may be provided, fitting tightly over the second indicator member 50, so that the indicator member 50 can be rotated by rotating the cap 60. Similarly, a sleeve 62 may be provided, fitting tightly over the first indicator member 40, through which the indicator member 40 may be rotated. The interiors of the sleeve 62 and cap 60 may be packed with a suitable grease to give protection against corrosion without affecting the free rotation of the indicator members.

Modifications may be made in the described embodiment. For example, the second indicator member 50 could be arranged to engage the outer end 16 of the bolt rather than the first indicator member 40, the second indicator member being made of a suitably large diameter, so that the recess 52 can accommodate the first indicator member 40. Alternatively, the second indicator member 50 could be arranged to engage the head 34 of the first gauge pin 30.

Figure 2:
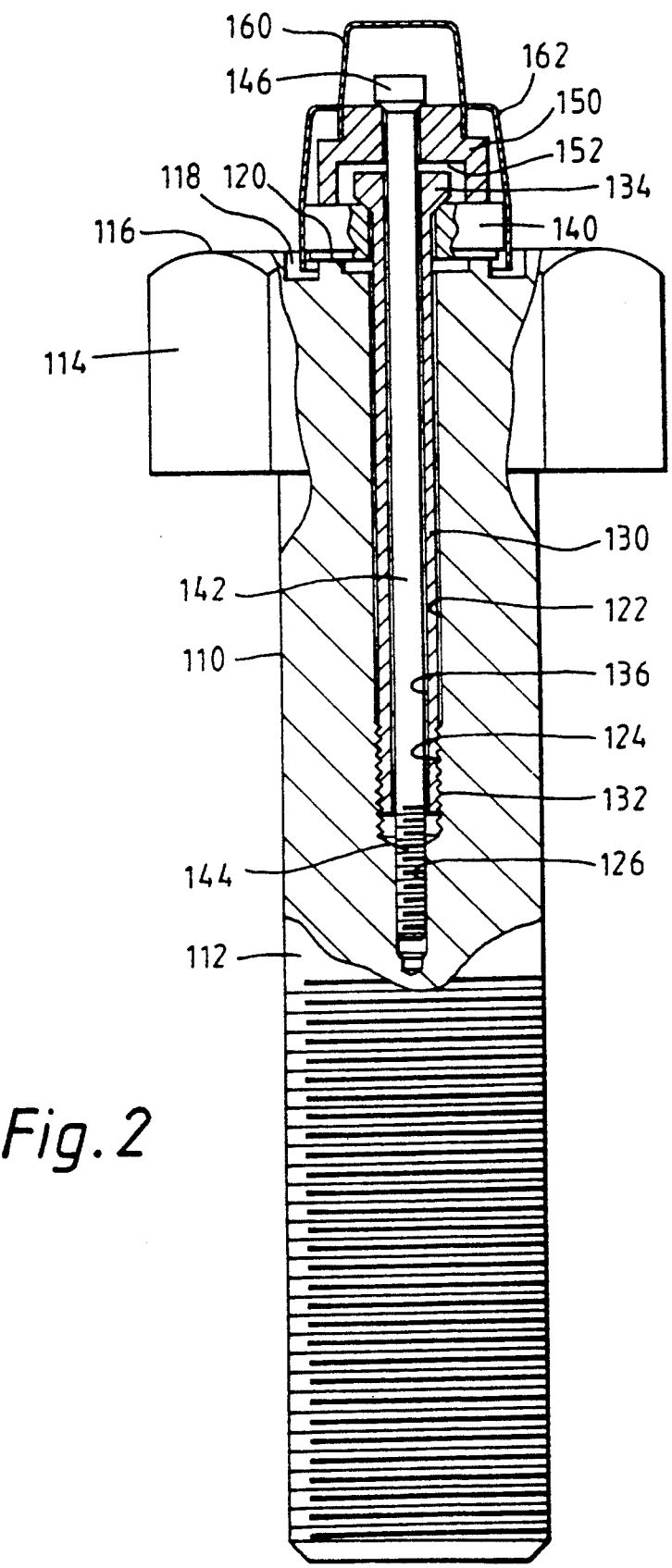
FIG. 2 is a side elevation, partly in cross-section, of a bolt in accordance with a second embodiment of the invention.

In FIG. 2, which shows a second embodiment of the invention, parts which correspond to those of the embodiment of FIG. 1 have been given the same reference numeral with the addition of the prefix "1". The bolt shown in FIG. 2 is generally the same as that shown in FIG. 1, except that the second gauge pin 142 is anchored at its inner end to the shank 112 of the bolt rather than to the first gauge pin 130. To this end, the bore 122 in the shank 112 of the bolt has a smaller diameter counterbore 126 extending beyond the threaded portion 124 of the bore. The second gauge pin 142 extends beyond the inner end of the first gauge pin 130, and its threaded end portion 144 engages an internal thread in the counterbore 126.

Operation of the embodiment of FIG. 2 is similar to that of the embodiment of FIG. 1.

In the embodiment of FIG. 2, the inner end of the first gauge pin 130 is secured to the shank, by engagement with the threaded portion 124 of the bore 122. In a further embodiment of the invention, the inner end of the first gauge pin 130 could be secured to the second gauge pin 142 at a location spaced from the inner end of the second gauge pin, both gauge pins being anchored to the shank 112 by the connection of the inner end of the second gauge pin 142 to the shank.

The invention could be applied to other fasteners which are subject to tensile loading, in particular to other screw-threaded fasteners, such as studs.

I claim:

1. A load indicating fastener comprising a body (12, 14) having a shank (12) which is subject to tensile loading in use, the body having a bore (22) which extends axially from an end face (16) of the body into the shank (12) and which receives a gauge pin (30) anchored at its inner end (32) to the shank (12) and protruding outwards beyond the end face (16) of the body (12, 14), an indicating member (40) rotatable on the protruding portion of the gauge pin (30) and arranged so that the indicating member (40) is free to rotate when the shank (12) of the fastener is unstressed but when the shank (12) is subject to a predetermined tensile loading is held against rotation by contact with the end face (16) of the body (12, 14), characterized in that the gauge pin (30) has an axially extending bore (36), and the fastener further comprises a second gauge pin (42) which is received within the bore (36) in the first gauge pin (30) and is anchored at its inner end and protrudes outwards beyond the outer end of the first gauge pin (30), and a second indicating member (50) which is rotatable on the protruding part of the second gauge pin (42), the second indicating member (50) being free to rotate when the shank (12) of the fastener is unstressed or subject to the first pre-determined loading, but being held against rotation by contact with another part of the fastener when the shank (12) is subject to a second predetermined tensile loading greater than the first predetermined loading.

2. A fastener as claimed in claim 1 in which the second gauge pin (42) is anchored at its inner end to the first gauge pin (30).

3. A fastener as claimed in claim 1, in which the second gauge pin (42) is anchored at its inner end to the shank (12).

4. A fastener as claimed in claim 1, in which, when the shank (12) is subject to the second predetermined loading, the second indicating member (50) is held against rotation by contact with the first indicating member (40).

5. A fastener as claimed in claim 4, in which the first indicating member is a disk (40) trapped between the outer end face (16) of the body of the fastener and a head (34) on the outer end of the first gauge pin (30), and the second indicating member (50) has an inner face arranged to abut the outer face of the disk (40), with a recess (52) formed in the inner face of the second indicating member (50) to accomodate the head (34) of the first gauge pin.

6. A fastener as claimed in claim 1, in which, when the shank (12) is subject to the second predetermined loading, the second indicating member is held against rotation by contact with the first gauge pin (30).

7. A fastener as claimed in claim 1, in which, when the shank (12) is subject to the second predetermined loading, the second indicating member is held against rotation by contact with the end face (16) of the body of the fastener.

* * * * *